(12) United States Patent
Nguyen

(10) Patent No.: US 10,322,442 B2
(45) Date of Patent: Jun. 18, 2019

(54) MANUFACTURING METHOD OF METAL STRIP COIL FOR BLADES

(71) Applicant: HITACHI METALS, LTD., Tokyo (JP)

(72) Inventor: Thanh-Nghia Nguyen, Shimane (JP)

(73) Assignee: HITACHI METALS, LTD., Tokyo (JP)

( * ) Notice: Subject to any disclaimer, the term of this patent is extended or adjusted under 35 U.S.C. 154(b) by 230 days.

(21) Appl. No.: 15/278,630

(22) Filed: Sep. 28, 2016

(65) Prior Publication Data

US 2017/0087613 A1 Mar. 30, 2017

(30) Foreign Application Priority Data

Sep. 30, 2015 (JP) ................................. 2015-195048

(51) Int. Cl.
*B23D 19/06* (2006.01)
*B21D 31/00* (2006.01)
*B21C 47/00* (2006.01)

(52) U.S. Cl.
CPC ............ *B21D 31/00* (2013.01); *B21C 47/006* (2013.01); *B23D 19/06* (2013.01)

(58) Field of Classification Search
CPC .... B23D 19/04; B23D 19/06; B21B 15/0007; B21C 47/006
See application file for complete search history.

(56) References Cited

U.S. PATENT DOCUMENTS

| 3,939,745 | A | * | 2/1976 | Weeks | B23D 19/04 83/425.3 |
| 4,922,778 | A | * | 5/1990 | Nagai | B23D 19/04 83/344 |
| 4,922,779 | A | * | 5/1990 | Fritz | B21B 31/04 83/481 |
| 5,924,347 | A | * | 7/1999 | Soderlund | B23D 19/06 83/425.4 |

FOREIGN PATENT DOCUMENTS

JP 2009-270196 11/2009

* cited by examiner

*Primary Examiner* — Debra M Sullivan
(74) *Attorney, Agent, or Firm* — Greenblum & Bernstein, P.L.C.

(57) ABSTRACT

A manufacturing method of a metal strip coil for blades includes performing, on a steel band after a finishing cold rolling, a slit process that divides the steel band into a plurality of metal strips via joint operation of circular upper and lower blade cutters, and winding the metal strip into a coil shape after the slit process. In the slit process, a clearance of the upper and lower cutters is set within 5-25% of a metal strip thickness; an overlap amount of the upper and lower cutters is set within 5-80% of the metal strip thickness; and a clearance variation during the slit process is 30% or lower of the clearance. After the slit process, the metal strip is wound into a coil shape so that sag formed on an edge of the metal strip is positioned toward an axis center of a reel winding up the metal strip.

16 Claims, 8 Drawing Sheets

MANUFACTURING METHOD OF METAL STRIP COIL FOR BLADES

CROSS-REFERENCE TO RELATED APPLICATIONS

The present application claims priority under 35 U.S.C. § 119 of Japanese Application No. 2015-195048, filed on Sep. 30, 2015, the disclosure of which is expressly incorporated by reference herein in its entirety.

BACKGROUND OF THE INVENTION

1. Field of the Invention

The present invention is related to a manufacturing method of a metal strip coil for blades.

2. Description of Related Art

A metal strip for blades to be used for cutters and the like is manufactured from a steel band by processing, after completing a cold rolling process, the steel band into a desired width through a slit process. With this type of manufacturing method for a metal strip for blades, Japanese Patent Laid-open Publication No. 2009-270196, for example, discloses a manufacturing method for a steel band for blades that alleviates residual stress by performing a slit process on a finishing cold rolling material and thereafter annealing for removing distortion.

As shown in FIG. 1, a metal strip for blades 4 which has been subjected to a slit process is wound into a coil shape. Commonly, in order to secure a space between metal strip coils 5a and 5b, a side plate 30 (shown in FIG. 2) and a separator 40 (shown in FIG. 3) are provided. However, burrs on edges of the metal strips formed during the slit process can become hooked on the side plate 30 or separator 40 during winding and unwinding, which may significantly lower workability. Further, fragments of the burrs and fragments of side plate 30 or the separator 40, which are created when the burrs collide with the side plate 30 or the separator 40, may then mix into the metal strips being wound and thereby lower the quality of the metal strips. In addition, a side surface (hereinafter referred to as slit surface) of the metal strip after the slit process is required to be an appropriate slit surface having controlled sizes for burr and sag. Otherwise, the slit surfaces can cause deviation in winding or shear defects. While the above-described Japanese Patent Laid-open Publication No. 2009-270196 discloses an invention that can alleviate residual stress and shows a superior effect of controlling shape deformation of a product, the invention does not address the foregoing circumstance and still has room for improvement.

SUMMARY OF THE INVENTION

The present invention provides a manufacturing method of a metal strip coil for blades that inhibits interference of burrs with a side plate and a separator during winding of the metal strip for blades, thereby inhibiting quality degradation due to contamination with fragments of the burrs or of the side plate/separator during winding. The present invention further provides an appropriate slit surface thereby inhibiting deviation in winding or shear defects.

According to the present invention, a manufacturing method of a metal strip coil for blades includes a process of performing, on a steel band after a finishing cold rolling, a slit process that divides the steel band into a plurality of metal strips via joint operation of a cylindrical upper blade cutter and a cylindrical lower blade cutter, and a process of winding the metal strip into a coil shape after the slit process. In the slit process, a clearance of the cylindrical upper blade cutter and the cylindrical lower blade cutter is set within 5-25% of a thickness of the metal strip; an overlap amount of the cylindrical upper blade cutter and the cylindrical lower blade cutter is set within 5-80% of the thickness of the metal strip; and a clearance variation during the slit process is 30% or lower of the clearance. After the slit process, the metal strip is wound into a coil shape so that a sag formed on a lateral edge of the metal strip is positioned toward an axis center of a reel winding up the metal strip. The clearance variation during the slit process is preferably 10% or less of the clearance. When the metal strip is wound into a coil shape after the slit process, tension of the metal strip at a winding start time is preferably set at 30-90 N/mm$^2$. In the process of the metal strip being wound into a coil shape after the slit process, tension of the metal strip at a winding end time is preferably set at 60-90% of the tension at the winding start time. The width of the metal strip after the slit process is preferably 2-340 mm.

According to the present invention, it is possible to inhibit interference of burrs with the side plate and the separator during winding of the metal strip for blades after slitting, thereby inhibiting quality degradation of the metal strip due to fragments of the burrs or of the side plate/separator. Further, the present invention inhibits deviation in winding or shear defects.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, a detailed description is given of an embodiment of the present invention. However, the present invention should not be interpreted as being limited to the following description. The composition of a metal strip according to the present embodiment may be a composition of high carbon stainless steel, which is commonly used in a steel band for blades. For example, one may employ a Fe-base alloy containing, by mass %, 0.3-1.5% of C, 10-18% of Cr, 1% or less (but not including 0%) of Si, and 1.5% or less (but not including 0%) of Mn as essential components, and containing 3% or less (and including 0%) of Mo as necessary.

Figure 1:
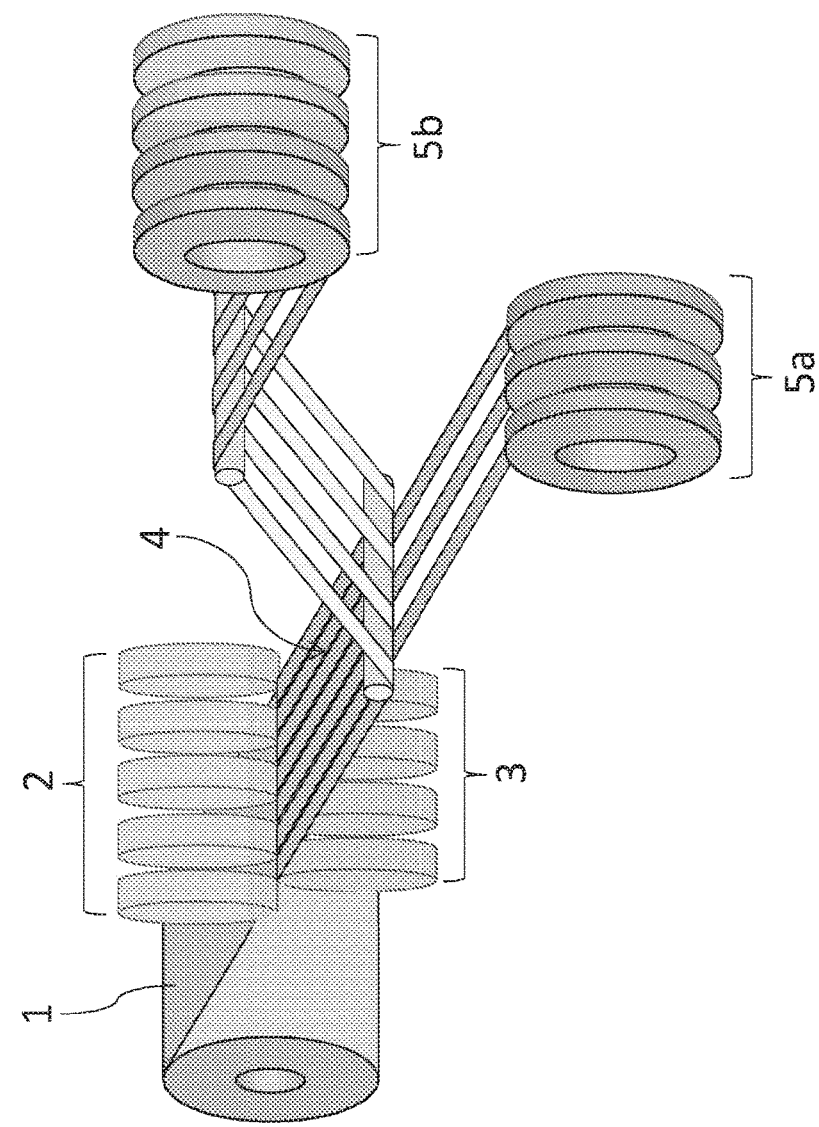
FIG. 1 is a schematic view illustrating an example of an equipment configuration used for a manufacturing method for a metal strip coil for blades, according to the present invention.
Figure 2:
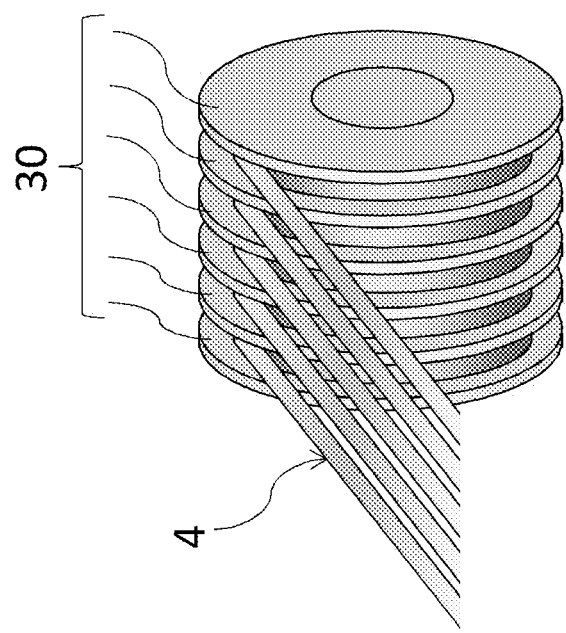
FIG. 2 is a schematic view illustrating an example of a side plate.
Figure 3:
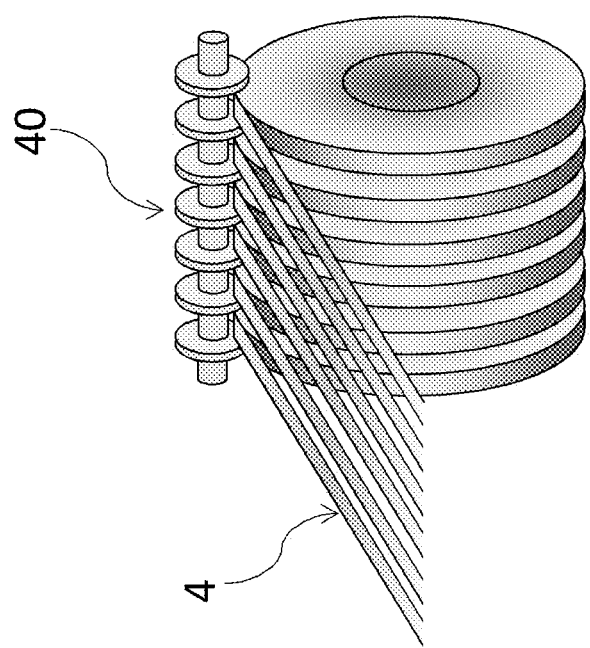
FIG. 3 is a schematic view illustrating an example of a separator.

FIG. 1 illustrates an example of an equipment configuration, from cutting to winding of a metal strip, used in the present invention. A steel band for blades 1 which has completed a finishing cold rolling process goes through a slit process that divides the steel band into a plurality of metal strips via joint operation of a cylindrical upper blade cutter 2 and a cylindrical lower blade cutter 3 and is formed into metal strips 4, after which the strips are wound into a coil shape by a reel (not shown in the drawing), forming metal strip coils 5a and 5b. FIGS. 2 and 3 are schematic views illustrating an example of a side plate 30 and a separator 40, which may be used in the present invention. The side plate 30 and the separator 40 are positioned between each metal strip so that the metal strips do not contact each other. Further, "joint operation of a cylindrical upper blade cutter and a cylindrical lower blade cutter" in this example means that blades of the cylindrical upper blade cutter and the cylindrical lower blade cutter are positioned to overlap in an axis direction of the cutters, and the cutters are rotated in mutually opposing directions, which causes the steel band to be cut through shearing.

Figure 4:
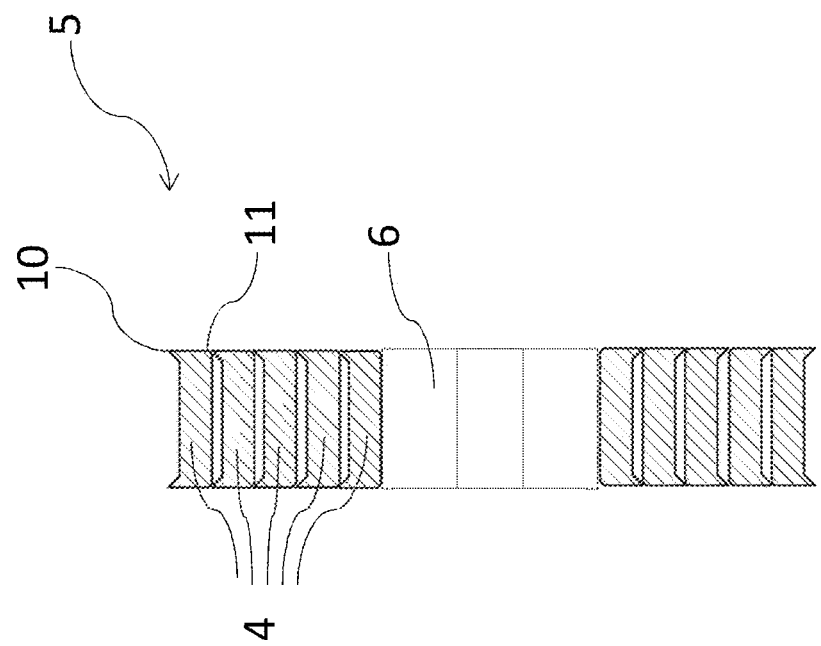
FIG. 4 is a schematic cross sectional view of the metal strip coil illustrating the present invention.
Figure 5:
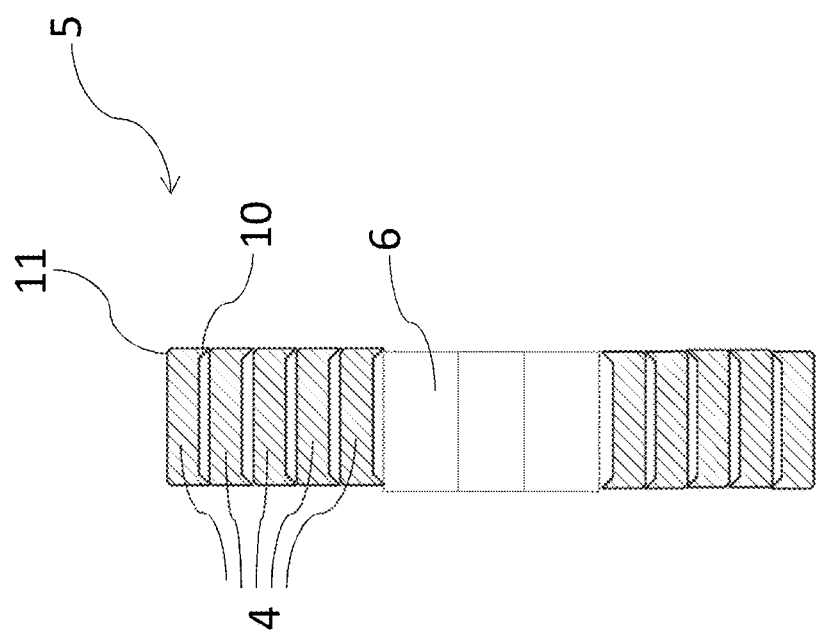
FIG. 5 is a schematic cross sectional view of a metal strip coil illustrating a manufacturing method in a comparative example.
Figure 7:
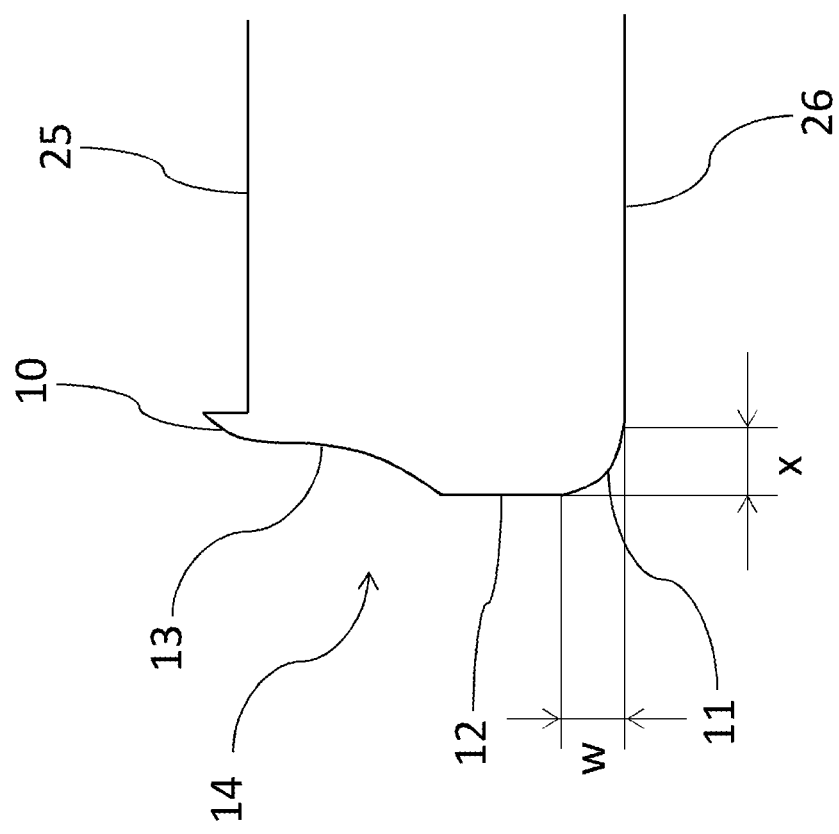
FIG. 7 is a schematic cross sectional view of an area near a slit surface of the metal strip according to the present invention.

FIG. 7 is a schematic cross sectional view of an area near a slit surface of the metal strip after the slit process is performed. When the steel band for blades undergoes the slit process, as shown in FIG. 7, a slit surface 14 after the slit process has a four layer structure including a sag 11, a sheared surface 12, a fractured surface 13, and a burr 10. The burr 10 has a pointed shape protruding from a metal strip upper surface 25, and the sag 11 has an overall smooth curved shape. An important aspect of the present invention is, as shown in FIG. 4, intentionally forming a sag of a predetermined size on the metal strip, while winding the metal strip such that the sag 11 (which has been formed on a lateral edge of the metal strip) is positioned toward the axis center of a reel 6, so that the burr 10 does not interfere with the side plate or separator. According to the configuration described above, when the metal strip is wound, the sag 11 having the smooth curvature contacts the side plate or separator. Therefore, interference of the burr with the side plate 30 is inhibited, inhibiting the likelihood of the metal strip getting hooked on the side plate 30 or the separator 40. In contrast, as shown in FIG. 5, when the sag 11 is positioned toward the outer circumference of the reel 6, the burr 10, which has a tendency to break easily, is positioned toward the axis center of the reel 6. Therefore, the metal strip is more likely to be hooked on the side plate 30 or the separator 40 during winding. Fragments created by a breakage of the burr 10, or fragments created by damage to the side plate 30 or separator 40 are likely to enter between metal strips. Further, the sag according to the present invention may have a partial or overall curved shape, and may include a shape having a partial flat portion. In the present embodiment, the sags are formed alternately on top and bottom sides of each adjacent metal strip. Thus, the metal strips are alternately separated into two different reels as shown in FIG. 1, where reels on a 5a side rotate in one direction, and reels on a 5b side rotate in the other direction. Since the metal strips are wound accordingly, there is no need to add a step of rewinding, thereby efficiently winding metal strips by having the sag of the metal strip toward the axis center of the reel.

Figure 6:
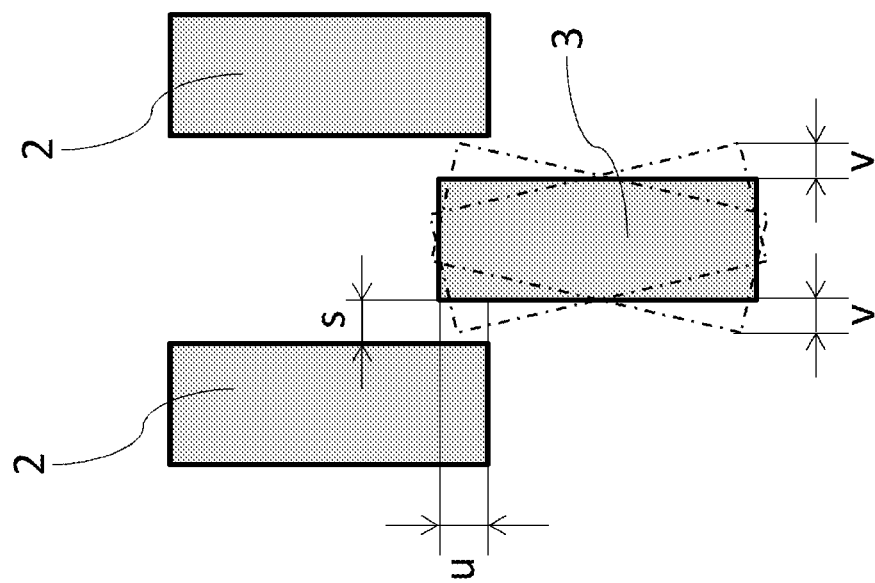
FIG. 6 is a schematic view illustrating a positional relationship between a cylindrical upper blade cutter and a cylindrical lower blade cutter that are used during a slit process according to the present invention.

FIG. 6 is a schematic view illustrating the cylindrical upper blade cutter 2 and the cylindrical lower blade cutter 3 used during the slit process according to the present invention. In the present embodiment, in order to obtain an appropriate slit surface having burr and sag portions with controlled sizes, there is a need to have an appropriate setting of clearance and overlap amount. A clearance s between the cylindrical upper blade cutter 2 and the cylindrical lower blade cutter 3 according to the present invention is preferably set within a range of 5-25% of a thickness of the metal strip. A lower limit of the clearance is preferably 10%, and an upper limit of the clearance is preferably 20%. When the clearance is less than 5%, an undesirable secondary sheared surface may occur, which is deemed defective in later processing. When the clearance is above 25%, a large burr is likely to occur, which can exceed 10% of the plate thickness, and which thereby can become a factor for deviation in winding. Further, an overlap amount u of the cylindrical upper blade cutter 2 and the cylindrical lower blade cutter 3 according to the present invention is preferably set within a range of 5-80% of the thickness of the metal strip. The lower limit of the overlap amount is preferably 20%, and the upper limit of the overlap amount is preferably 60%. When the overlap amount is less than 5%, cutting of the steel band becomes difficult, whereas when the overlap amount is above 80%, an excessively large sag is likely to be formed, which can become a factor for distortion in the metal strip. In this example, setting the clearance s of the cylindrical upper blade cutter 2 and the cylindrical lower blade cutter 3 within a range of 5-25% of the thickness of the metal strip, and setting the overlap amount u of the cylindrical upper blade cutter 2 and the cylindrical lower blade cutter 3 within a range of 5-80% of the thickness of the metal strip show the positional relationship before the processing.

Further, in the present invention, in order to obtain an appropriate slit surface from stable slit processing, the clearance variation during the processing is preferably 30% or less of the set clearance. As shown in FIG. 6, this clearance variation is measured by considering displacement of the cutter in a horizontal direction during the processing as the clearance variation v, with the position of the cutter before the processing as a reference position. When the clearance variation v exceeds 30% of the set clearance (positional relationship of the cutter prior to processing), stable slit processing cannot be performed, and a secondary sheared surface or an excessively large burr is likely to be formed. The clearance variation v during the processing is preferably 10% or less of the set clearance. In addition, the clearance variation can be set to a desired variation by adjusting a clamping force of the cutter by using an ordinary rotation axis fixing jig, for example. Further, the clearance variation may be measured by abutting a dial gauge to a driven cutter blade portion, or installing a sensor, for example.

The width of the metal strip according to the present invention is preferably 2-340 mm. Also, in order to obtain an appropriate slit surface with the present invention, hardness of the metal strip is preferably 190-370 HV. More preferably, the hardness of the metal strip is 210-350 HV. While the external diameter of the metal strip coil manufactured with the present invention is not particularly limited, the present invention is preferably applied to an external diameter of 280-1300 mm.

In the present invention, when the metal strip is wound into a coil after the slit process, tension of the metal strip at a winding start time is preferably set at 30-90 N/mm$^2$. Accordingly, it is possible to inhibit a defective shape of the metal strip coil. When the tension at the winding start time is less than 30 N/mm$^2$, a so-called telescope defect (causing a central area of the metal strip to protrude in the width direction) is likely to occur. When the tension at the winding start time is greater than 90 N/mm$^2$, the metal strip coil tends to bend toward the inner diameter (buckling) of the metal strip coil, or lateral bending (due to an excessive winding force) is likely to occur.

In the present invention, in a process of the metal strip being wound into a coil after the slit process, tension of the metal strip at a winding end time is preferably set at 60-90% of the tension at the winding start time. Further, when the metal strip is wound into a coil after the slit process, it is preferred that the winding tension be gradually lowered from the winding start time to the winding end time. By controlling the winding tension as described above, internal stress of the metal coil is adjusted, and it is possible to inhibit shape defects (e.g., star defect, a chrysanthemum-shaped pattern due to buckling) which occur in a central portion of the coil. In this description, "gradually lowered" means the winding tension is lowered linearly or along a curve in the above-described period from the winding start time to the winding end time, without raising or suddenly lowering the tension during winding. Alternatively, it is possible to partially provide a period (in stages) where the winding tension stays constant without being lowered. In order to control the winding tension of the present invention, the tension control may be performed through rotation speed control of the reel that winds the metal strip for blades, or through a friction resistance control mechanism, for example. Also, an ordinary tension control device (e.g., tension pad, bridle roll, etc.) may be installed in front of the winding reel, in order to perform the tension control.

The metal strip coil for blades manufactured with the manufacturing method according to the present embodiment has a metal strip thickness of 3 mm or less, and includes a substantially arc-shaped sag on the lateral edge in the width direction due to the above-described manufacturing method. The shape of the sag has a favorable feature. In other words, in the cross section view in a thickness direction of the metal strip, the sag of the present invention has a formation range in a sag thickness direction (range shown as w in FIG. 7) preferably set at 3-12% of the metal strip thickness (more preferably, 5-10%), and similarly has a formation range in the sag width direction (range shown as x in FIG. 7) preferably set at 3-12% of the metal strip thickness (more preferably, 5-10%). With the features described above, it is possible to further enhance inhibition of interference during winding, due to the sag. When the formation range of the sag exceeds 12% of the metal strip thickness, an excessively large burr exceeding 10% of the plate thickness is likely to be formed, which tends to increase the occurrence of deviation in winding.

The metal strip coil for blades according to the present invention has a burr at the lateral edge in the width direction, and the length of the burr in the cross section view in the thickness direction of the metal strip (length in the metal strip thickness direction, i.e., the length of protrusion from the metal strip) is preferably 10% or less of the thickness of the metal strip. Accordingly, it is possible to obtain a metal strip coil having a preferable shape that further inhibits deviation in winding.

EXAMPLE

The following example is provided to illustrate the present invention in more detail. First, a steel ingot of martensitic stainless steel having the composition shown in Chart 1 was manufactured. Then, hot forging was performed to manufacture a billet. Then, after repeated annealing and cold rolling, finishing cold rolling was performed to manufacture a steel band for blades having a thickness of 0.1 mm. The chemical composition is shown in Chart 1.

CHART 1

| C | Si | Mn | Cr | Remainder |
|---|----|----|----|-----------|
| 0.68 | 0.29 | 0.73 | 13.26 | Fe and unavoidable impurities |

* unit is mass %

The manufactured steel band having the thickness of 0.1 mm was processed through the slit process via joint operation of the cylindrical upper blade cutter and the cylindrical lower blade cutter, under the conditions shown in the example according to the present invention and comparative example shown in Chart 2, and a metal strip having a product width of 16 mm was manufactured. Then, the metal strip was wound into a coil on a reel, and a metal strip coil (inner diameter: 280 mm, outer diameter: 1300 mm) was manufactured. Then, samples were collected from the manufactured coil, and surfaces and slit surfaces were observed. A side plate as shown in FIG. 2 was provided between the metal strips. In this example, winding tension of the metal strip was not controlled, and the winding was performed with a constant tension value. The result is shown in Chart 2.

CHART 2

| | | | | | Evaluation result | |
|---|---|---|---|---|---|---|
| No. | Clearance (%)[1] | Overlap amount (%)[1] | Clearance variation (%)[2] | Winding style[3] | Mixed in fragments | Evaluation of slit surface[4] |
| 1 | 20 | 75 | 25 | Sag down | None | ○ |
| 2 | 20 | 75 | 9 | Sag down | None | ◎ |
| 11 | 20 | 75 | 35 | Sag down | None | x |
| 12 | 20 | 75 | 25 | Sag up | YES | ○ |
| 13 | 4 | 75 | 25 | Sag down | None | x |
| 14 | 30 | 75 | 25 | Sag down | None | x |
| 15 | 20 | 120 | 25 | Sag down | None | x |

Figure 8:
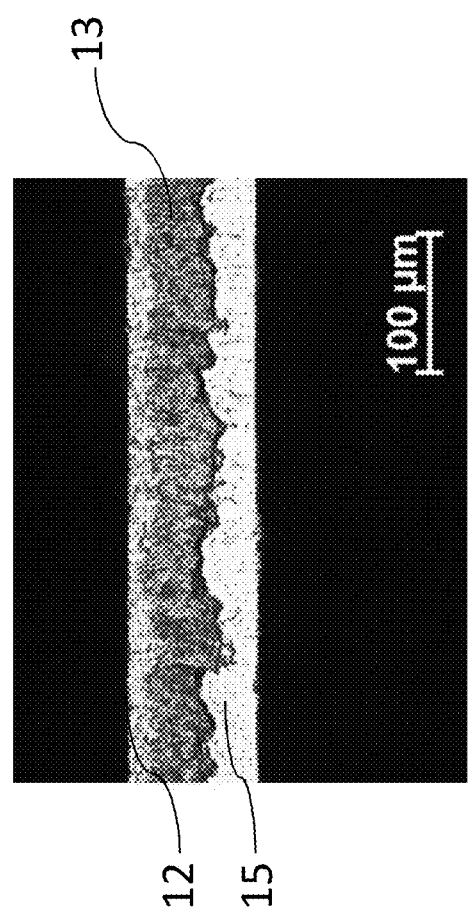
FIG. 8 is an observation photo showing an example of a secondary sheared surface due to having a clearance that is too small.

[1] Ratio to metal strip thickness
[2] Ratio to clearance value
[3] Sag down: winding to position the sag toward the axis center of the reel
Sag up: winding to position the sag toward the outer circumference of the reel
[4] Evaluation:
◎ No occurrence of excessively large burr, sag, or secondary sheared surface; burr and sag are evenly formed
○ No occurrence of excessively large burr, sag, or secondary sheared surface; burr and sag are unevenly formed
x Occurrence of excessively large burr, sag, or secondary sheared surface
*Nos. 1 and 2 are embodiments of the present invention
*Nos. 11 to 15 are comparative examples As shown in Chart 2, sample Nos. 1 and 2 did not show contamination by fragments of the burrs or of the side plate/separator on their surfaces. Further, there was no occurrence of an excessively large burr exceeding 10% of the plate thickness on their slit surfaces. The size of sags was 3-12% of the plate thickness. Especially with regard to sample No. 2, since the clearance variation was small, formation of uniform sags was observed. In contrast, in comparative example No. 11, the clearance variation was too large, a therefore secondary sheared surface (which is deemed defective in a subsequent process) and excessively large burrs (exceeding 10% of the plate thickness) were observed. Comparative example No. 12 had a preferable slit surface, but fragments of the burrs and side plate were observed on the sample surface. In comparative example No. 13, as shown in FIG. 8, a secondary sheared surface, which is caused by having the clearance too small, was observed. In comparative example No. 14, excessively large burrs (exceeding 10% of the plate thickness) were observed. In comparative example No. 15, excessively large sags (exceeding 12% of the plate thickness), which can become a factor for distortion, were observed.

Next, metal strip coils with varying conditions of winding tension, in addition to the conditions for No. 2 in Chart 2, were manufactured and the shapes of the resulting metal strip coils were observed. The result is shown in Chart 3. In sample Nos. 3, 4, 16, and 17, winding was performed by continuously decreasing the tension value from the winding start time to the winding end time. As shown in Chart 3, the metal strip coil sample Nos. 3 and 4 did not have any defective shapes, and had preferable results. In the metal strip coil sample No. 16, telescope defect due to having the tension too low at the winding start time was observed, while in the metal strip coil No. 17, a buckling defect due to having the tension too high at the winding start time was observed. In the sample No. 18, in which the tension was not controlled and the metal strip was wound at a constant tension, a chrysanthemum pattern due to buckling was observed.

CHART 3

| No. | Tension at winding start time (N/mm$^2$) | Tension at winding end time (N/mm$^2$) | Evaluation of winding shape of metal strip coil[5] |
|---|---|---|---|
| 3 | 40 | 32 | ○ |
| 4 | 80 | 64 | ○ |
| 16 | 20 | 16 | x |
| 17 | 100 | 80 | x |
| 18 | 80 | 80 | x |

[5]Evaluation:
○ . . . No defective shape
x . . . Occurrence of defective shape
* Nos. 3 and 4 are embodiments of the present invention
* Nos. 16 to 18 are comparative examples It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A manufacturing method of a metal strip coil for blades comprising:
   performing, on a steel band after a finishing cold rolling, a strip winding slit process via joint operation of a cylindrical upper blade cutter and a cylindrical lower blade cutter, wherein a sag and a burr are formed on a lateral edge of the metal strip as a result of the slit process; and
   winding the metal strip onto a reel such that the metal strip is wound into a coil shape after the strip winding slit process,
   wherein in the strip winding slit process, a clearance of the cylindrical upper blade cutter and the cylindrical lower blade cutter is set within 5-25% of a thickness of the metal strip; an overlap amount of the cylindrical upper blade cutter and the cylindrical lower blade cutter is set within 5-80% of the thickness of the metal strip; and a clearance variation during the slit process is 30% or lower of the clearance, and
   wherein, after the strip winding slit process, the metal strip is wound into the coil shape so that the sag is positioned closer to a central axis of the reel than the burr.

2. The manufacturing method of a metal strip coil for blades according to claim 1, wherein the clearance variation during the slit process is 10% or less of the clearance.

3. The manufacturing method of a metal strip coil for blades according to claim 2, wherein, when the metal strip is wound into a coil shape after the slit process, tension of the metal strip at a winding start time is set within a range of 30-90 N/mm$^2$.

4. The manufacturing method of a metal strip coil for blades according to claim 3, wherein, in the process of the metal strip being wound into a coil shape after the slit process, tension of the metal strip at a winding end time is set at 60-90% of the tension at the winding start time.

5. The manufacturing method of a metal strip coil for blades according to claim 4, wherein the width of the metal strip after the slit process is 2-340 mm.

6. The manufacturing method of a metal strip coil for blades according to claim 3, wherein the width of the metal strip after the slit process is 2-340 mm.

7. The manufacturing method of a metal strip coil for blades according to claim 2, wherein, in the process of the metal strip being wound into a coil shape after the strip winding slit process, tension of the metal strip at a winding end time is set at 60-90% of a tension at a winding start time.

8. The manufacturing method of a metal strip coil for blades according to claim 7, wherein the width of the metal strip after the slit process is 2-340 mm.

9. The manufacturing method of a metal strip coil for blades according to claim 2, wherein the width of the metal strip after the slit process is 2-340 mm.

10. The manufacturing method of a metal strip coil for blades according to claim 1, wherein, when the metal strip is wound into a coil shape after the slit process, tension of the metal strip at a winding start time is set within a range of 30-90 N/mm².

11. The manufacturing method of a metal strip coil for blades according to claim 10, wherein, in the process of the metal strip being wound into a coil shape after the slit process, tension of the metal strip at a winding end time is set at 60-90% of the tension at the winding start time.

12. The manufacturing method of a metal strip coil for blades according to claim 11, wherein the width of the metal strip after the slit process is 2-340 mm.

13. The manufacturing method of a metal strip coil for blades according to claim 10, wherein the width of the metal strip after the slit process is 2-340 mm.

14. The manufacturing method of a metal strip coil for blades according to claim 1, wherein, in the process of the metal strip being wound into a coil shape after the strip winding slit process, tension of the metal strip at a winding end time is set at 60-90% of a tension at a winding start time.

15. The manufacturing method of a metal strip coil for blades according to claim 14, wherein the width of the metal strip after the slit process is 2-340 mm.

16. The manufacturing method of a metal strip coil for blades according to claim 1, wherein the width of the metal strip after the slit process is 2-340 mm.

* * * * *